US006744433B1

United States Patent
Bastos et al.

(10) Patent No.: US 6,744,433 B1
(45) Date of Patent: Jun. 1, 2004

(54) SYSTEM AND METHOD FOR USING AND COLLECTING INFORMATION FROM A PLURALITY OF DEPTH LAYERS

(75) Inventors: Rui M. Bastos, Santa Clara, CA (US); Cass W. Everitt, Pflugerville, TX (US); Mark J. Kilgard, Austin, TX (US)

(73) Assignee: nVidia Corporation, Santa Clara, CA (US)

( * ) Notice: Subject to any disclaimer, the term of this patent is extended or adjusted under 35 U.S.C. 154(b) by 271 days.

(21) Appl. No.: 09/945,444

(22) Filed: Aug. 31, 2001

(51) Int. Cl.[7] .............................................. G06T 15/40
(52) U.S. Cl. ...................... 345/422; 345/426; 345/581; 345/582; 345/506
(58) Field of Search ................................ 345/421, 422, 345/426, 582, 506, 611, 591, 593, 589

(56) References Cited

U.S. PATENT DOCUMENTS 6,252,608 B1 * 6/2001 Snyder et al. .............. 345/473
6,268,875 B1 * 7/2001 Duluk et al. ................ 345/506

OTHER PUBLICATIONS

Segal et al, The Open GL® Graphics System: A Specification (Version 1.3), Aug. 14, 2001, Mountain View, CA.

* cited by examiner

Primary Examiner—Mark Zimmerman
Assistant Examiner—Kimbinh T. Nguyen
(74) Attorney, Agent, or Firm—Silicon Valley IP Group, PC; Kevin J. Zilka (57) ABSTRACT

A system and method are provided for using information from at least one depth layer and for collecting information about at least one additional depth layer utilizing a graphics pipeline. Initially, constraining depth layers are provided which, in turn, define a plurality of depth constraints. Next, a plurality of tests is performed involving the constraining depth layers for collecting information about at least one additional depth layer. The information relating to the at least one depth layer may then be used to improve processing in the graphics pipeline. By the foregoing multiple tests, information relating to a plurality of depth layers may be collected during each of a plurality of rendering passes. Initially, information relating to the constraining depth layers and associated depth constraints is provided in the aforementioned manner. Thereafter, information relating to at least one additional depth layer is collected during additional rendering passes using multiple tests on each rendering pass. Once collected, such information relating to the constraining depth layers and the information relating to the at least one additional depth layer may be used to further improve processing in the graphics pipeline.

27 Claims, 7 Drawing Sheets

"A"
Previous Layer

"B"
Additional Present Layer

SYSTEM AND METHOD FOR USING AND COLLECTING INFORMATION FROM A PLURALITY OF DEPTH LAYERS

RELATED APPLICATION

The present application is related to co-pending applications entitled "ORDER-INDEPENDENT TRANSPARENCY RENDERING SYSTEM AND METHOD" filed concurrently herewith under Ser. No. 09/944,988 and naming the same inventors as the present application, and "SYSTEM AND METHOD FOR DUAL-DEPTH SHADOW MAPPING" filed concurrently herewith under Ser. No. 09/944,990 and naming the same inventors as the present application, which are each incorporated herein by reference in their entirety.

FIELD OF THE INVENTION

The present invention relates to computer graphics, and more particularly to collecting and using information in a graphics pipeline for improving an output thereof.

BACKGROUND OF THE INVENTION

A major objective in graphics rendering is to produce images that are so realistic that the observer believes the images are real. A fundamental difficulty in achieving total visual realism is the complexity of accurately representing real world visual effects. A scene can include a wide variety of textures, subtle color gradations, reflections, translucency, etc. To achieve this realism, much graphics information must be collected in the graphics pipeline.

For example, one important way to make images more realistic is to determine how objects in a scene cast shadows, and then represent these shadows in the rendered image. In order to accurately portray such shadows, information in the form of various z-values must be collected.

Various other examples of graphics processing techniques exist which are used to promote realism, and require the collection of additional information. In particular, transparency rendering, blending, layered depth images (LDIs), fog, etc. are all further examples of such graphics processing techniques.

Computer graphics pipeline designers are always searching for new, innovative ways to collect graphics information in the graphics pipeline for enabling new graphics processing techniques and improving existing graphics processing techniques.

DISCLOSURE OF THE INVENTION

A system and method are provided for using information from at least one depth layer and for collecting information about at least one additional depth layer utilizing a graphics pipeline. Initially, constraining depth layers are provided which, in turn, define a plurality of depth constraints. Such constraining depth layers may be received as results from various rendering passes or may be provided as some other user-created depth layers produced with a CPU or the like. Next, a plurality of tests is performed involving the constraining depth layers for collecting information about at least one additional depth layer. The information relating to the at least one depth layer may then be used to improve processing in the graphics pipeline.

By the foregoing multiple tests, information relating to a plurality of depth layers may be collected during each of a plurality of rendering passes. Initially, information relating to the constraining depth layers and associated depth constraints are provided in the aforementioned manner. Thereafter, information relating to at least one additional depth layer is collected during additional rendering passes using multiple tests on each rendering pass. Once collected, such information relating to the constraining depth layers and the information relating to the at least one additional depth layer may be used to further improve processing in the graphics pipeline.

In one embodiment, the information may include depth values, i.e. z-values. Of course, any other types of values, parameters, attributes, etc. may be collected per the desires of the user. As an option, the tests may include depth tests. Of course, however, the tests may optionally include stencil tests or any other desired fragment-level tests.

As mentioned earlier, the information relating to the initial constraining depth layers may be collected in any desired manner (i.e. during initial rendering passes, from a user-selected sources, etc.) In use, the information relating to the at least one additional depth layer may be collected during at least one additional rendering pass. The at least one additional rendering pass may be taken from an eye position from which previous rendering passes are taken.

As an option, shadow-mapping, alpha-test, z-test, and/or other similar hardware may be used to carry out the rendering passes in the previous embodiment. In such case, the information relating to the depth layers may take the form of shadow maps. Of course, the rendering passes may input and output depth layers in any form without the use of shadow-mapping techniques, and information may just as easily be collected from such rendering results.

In still another embodiment, the information relating to the at least one additional depth layer may be collected by removing a portion of the scene associated with a set of constraining depth layers. In particular, this may be accomplished by performing at least one test. In an embodiment where the test works from a front of the scene to a back of the scene, the test may determine whether the portion of the scene associated with the constraining depth layers is in front of the at least one additional depth layer. If it is determined that the portion of the scene associated with the at least one additional depth layer is in front of the constraining depth layers, the particular portion of the scene is removed. Of course, the test may also work from the back of the scene to the front of the scene. Further, multiple tests may be performed to remove numerous portions of the scene or in a more selective form.

In one aspect of the present embodiment, the test may calculate differences between z-values relating to the constraining depth layers and a z-value relating to the at least one additional depth layer. In operation, a particular portion of the scene may be removed based on a test calculated involving the z-values relating to the constraining depth layers and the z-value relating to the at least one additional depth layer.

In the context of the embodiment where shadow mapping hardware is utilized, the z-values relating to the constraining depth layers may be computed using the same hardware method that produces the z-values corresponding to the at least one additional depth layer, which improves accuracy of the tests.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the following drawings.

DESCRIPTION OF THE PREFERRED EMBODIMENTS

Figure 1:
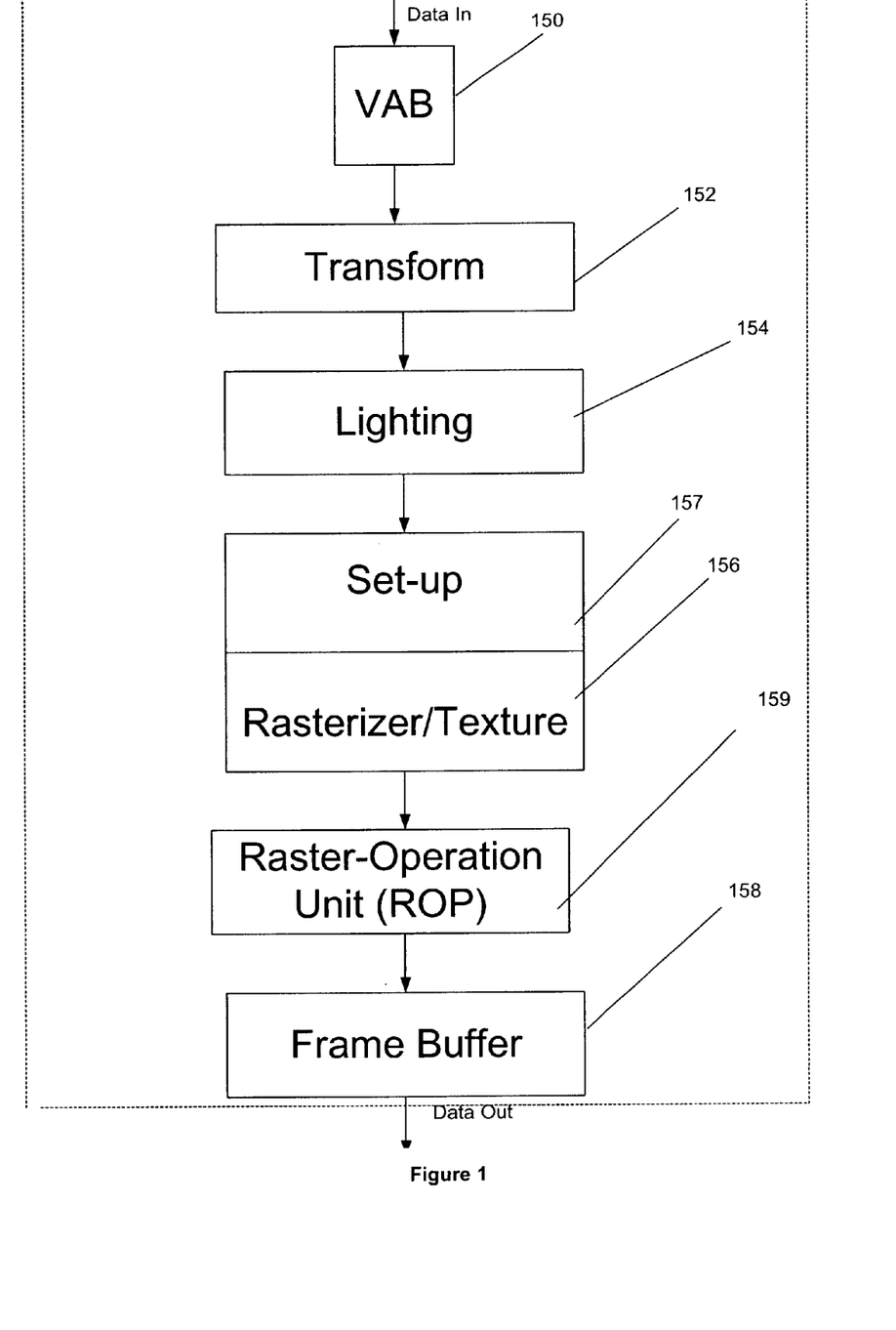
FIG. 1 is a system diagram illustrating the various components of one embodiment of the present invention.

FIG. 1 is a system diagram illustrating the various components of one embodiment of the present invention. As shown, the present embodiment may be divided into a plurality of modules including a vertex attribute buffer (VAB) 150, a transform module 152, a lighting module 154, a rasterization/texturing module 156 with a set-up module 157, a raster-operation module (ROP) 159, and a frame buffer 158.

In one embodiment, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

During operation, the VAB 150 is included for gathering and maintaining a plurality of vertex attribute states such as position, normal, colors, texture coordinates, etc. Completed vertices are processed by the transform module 152 and then sent to the lighting module 154. The transform module 152 generates vectors for the lighting module 154 to light.

The output of the lighting module 454 is screen-space data suitable for the set-up module 157, which, in turn, sets up primitives. Thereafter, rasterization/texturing module 156 carries out rasterization and texturing of the primitives. As strictly an option, the rasterization/texturing module 156 may be equipped with shadow-mapping hardware for carrying out shadow mapping. Shadow mapping is a well-known technique for depicting objects of a scene with shadows, where the per-fragment shadow-mapping results are encoded in the color and alpha channels.

Output of the rasterization/texturing module 156 is then sent to the raster-operation module 159 for performing alpha and z buffering tests. It should be noted that the alpha-test component of the hardware might be used to discard fragments/pixels that fail a depth-test performed during shadow mapping.

The output of the raster-operation module 159 is then sent to a frame buffer 158 for storage prior to being output to a display device (not shown).

Figure 2:
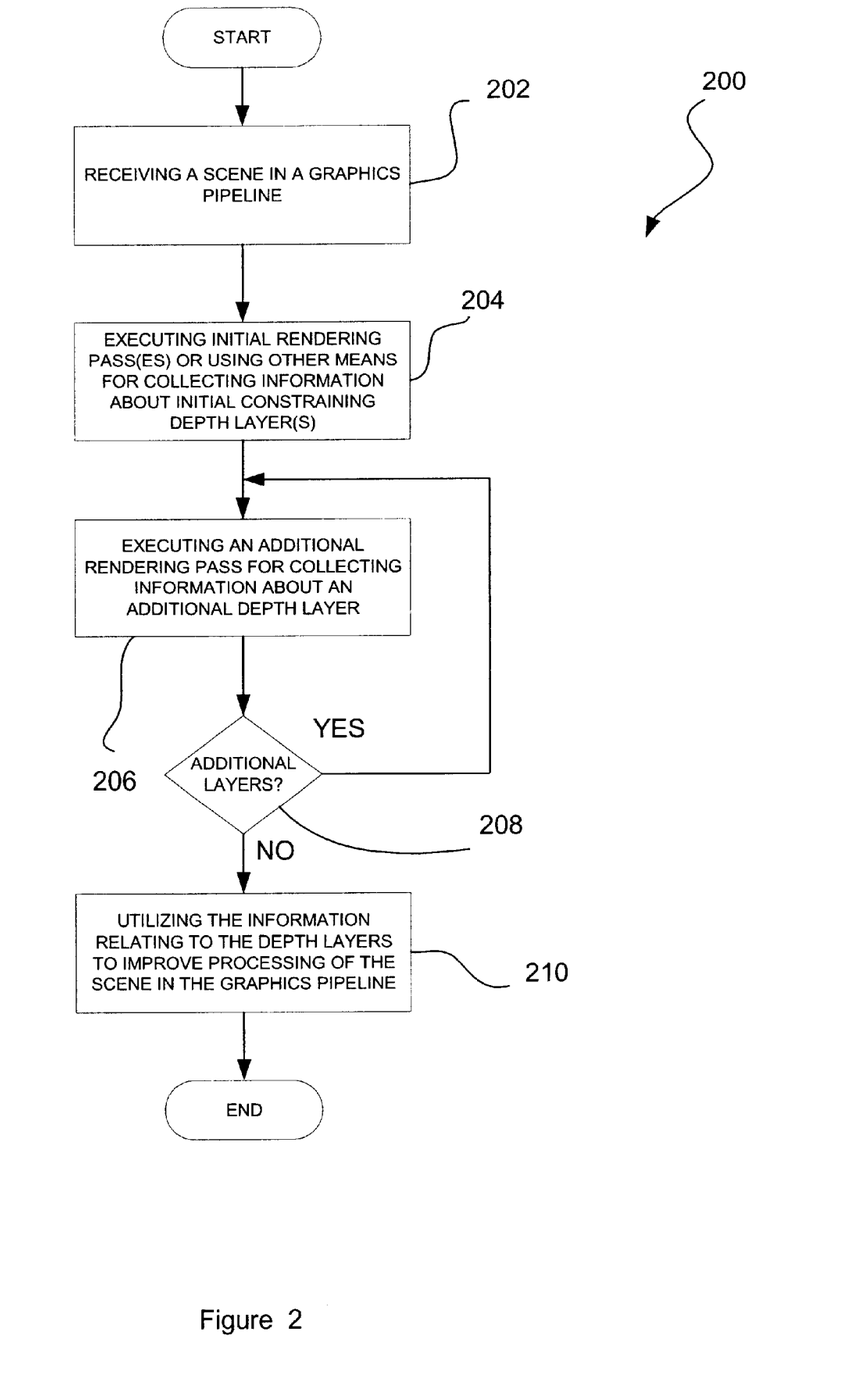
FIG. 2 illustrates a process for collecting and using information in a graphics pipeline such as that shown in FIG. 1.

FIG. 2 illustrates a method 200 for collecting and using information in a graphics pipeline such as that shown in FIG. 1. While the present method 200 is described in the context of the graphics pipeline shown in FIG. 1, it should be noted that the principles set forth herein may be implemented in any desired architecture.

Initially, in operation 202, a scene is received in the graphics pipeline. In the context of the present description, a scene may refer to any particular set of objects, polygons, primitives, etc. that are to be rendered. In particular, the scene is received in the rasterizer/texture module 156 of the pipeline of FIG. 1.

Next, in operation 204, initial rendering passes may be executed or user-created buffer received for collecting information about initial depth layers. It should be noted that the initial depth layers may be collected in any desired manner. In use, the initial depth layers may be used as constraining depth layers which inherently define a plurality of depth constraints. The manner in which such initial depth layers operate as constraining depth layers will be set forth hereinafter in greater detail.

In the context of the present description, each rendering pass refers to any separate set of processes carried out by the rasterizer/texture module 156. More information regarding the initial rendering passes in operation 204 will be set forth in greater detail during reference to FIG. 3. In addition to or as an alternative for the initial rendering passes, one or more depth layers, in the form of shadow maps, may be directly received in the graphics pipeline. For more information regarding shadow mapping, reference may be made to a patent entitled "SYSTEM, METHOD AND ARTICLE OF MANUFACTURE FOR SHADOW MAPPING" which was filed Dec. 5, 2000 under Ser. No. 09/730,639 and issued under U.S. Pat. No. 6,690,372, and which is incorporated herein by reference.

The information that is collected in operation 204 may include depth values (i.e. z-values), transparency information, color information, or absolutely any other type of data, parameters, or attributes that may be used to improve the realism resulting from the rendering process. Moreover, similar to each of the depth layers set forth in the present description, the constraining depth layers may include a portion of the scene (i.e. pixels corresponding to objects, polygons, primitives, etc.) that resides at predetermined depth levels in the scene. In the context of the present description, the term "depth" may refer to a distance or vector length between an eye/camera location and the corresponding fragment coordinates in a scene.

Thereafter, in operation 206, at least one additional rendering pass is executed for collecting information about additional depth layers. As indicated by decision 208, the operation 206 is repeated for each additional depth layer desired. For reasons that will soon become apparent, the results of the rendering passes of operations 204 and 206 may be stored in memory such as a texture member associated with the graphics pipeline.

It should be noted that a plurality of depth tests may be performed on the results from each additional rendering pass as well as on other depth layers. Utilizing such multiple depth tests and multiple depth layers, information may be collected from a desired depth layer. More information regarding the at least one additional rendering pass and the associated multiple depth tests in operation 206 will be set forth in greater detail during reference to FIG. 4.

Once it is determined in decision 208 that no additional depth layers are desired, the information relating to each of the depth layers may be utilized to improve processing of the scene in the graphics pipeline. See operation 210. In particular, the information may be used to improve the realism resulting from the rendering process in the graphics pipeline.

Figure 3:
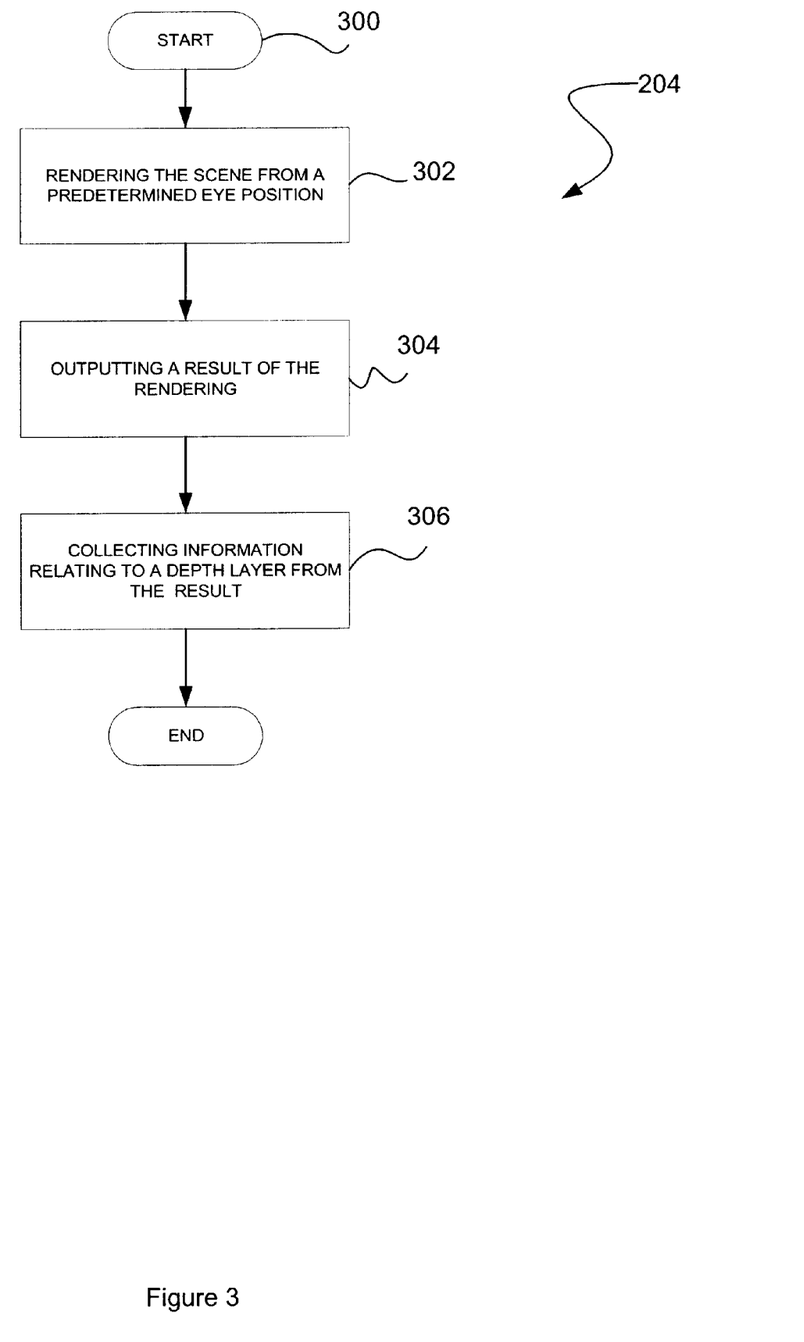
FIG. 3 illustrates a method associated with the initial rendering pass(es) of the process of FIG. 2.

FIG. 3 illustrates a method 300 associated with the initial rendering passes, in accordance with operation 204 of FIG. 2. As shown, the scene is initially rendered from a predetermined eye position in a manner that is well known in the art. See operation 302.

A result of the operation 302 is then outputted in operation 304. It should be noted that the result of operation 302 may take any form that includes at least a portion of a rendered scene from which the information (i.e. data, parameters, attributes, etc.) relating to the constraining depth layers may be collected. Note operation 306.

As mentioned earlier, the rasterization/texturing module 156 may be equipped with shadow-mapping hardware for carrying out shadow mapping. In such case, the results of operation 302 may take the form of shadow maps. Similar to other types of rendering results, information (i.e. data, parameters, attributes, etc.) relating to the constraining depth layers may be collected in the form of shadow maps.

Figure 4:
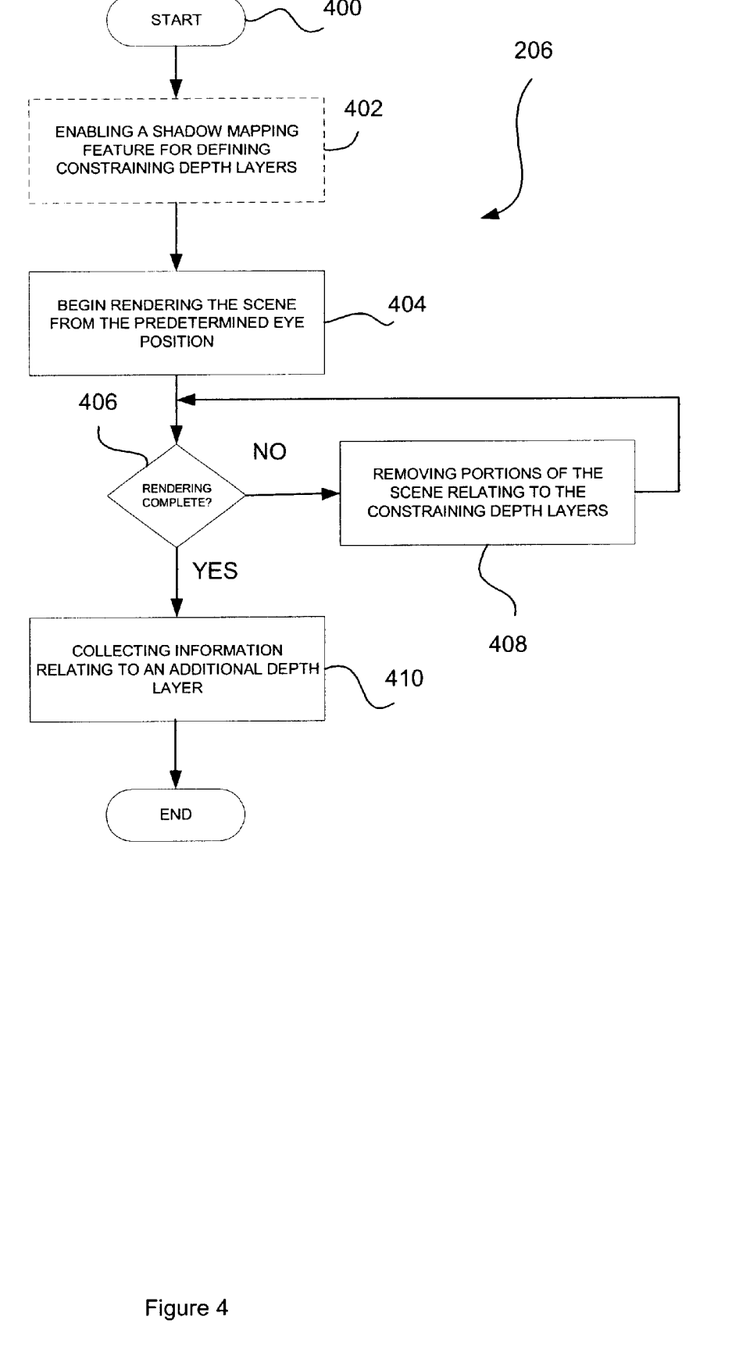
FIG. 4 illustrates a method for executing one pass of the at least one additional rendering pass of the process of FIG. 2.

FIG. 4 illustrates a method 400 for executing the at least one additional rendering pass, in accordance with operation 206 of FIG. 2. Initially, in operation 404, the scene is rendered utilizing the rasterizer/texture module 156 of the graphics pipeline. For reasons that will soon become apparent, it is important that the scene be rendered from the predetermined eye position associated with the first rendering pass of operation 204 of FIG. 2.

In the context of an embodiment where shadow-mapping and alpha-test hardware is optionally utilized, an additional optional operation may take place. In particular, a shadow-mapping feature may be enabled during the at least one additional rendering pass in operation 402. The shadow-mapping feature serves for defining the previous depth layers. In the first instance of operation 404 of FIG. 4, the previous depth layers would be defined as the constraining depth layers, and so forth. By utilizing the shadow-mapping and alpha-test hardware in such a manner, another shadow map is outputted, which may be utilized as or added to the constraining depth layers during subsequent rendering passes.

In an embodiment where the shadow-mapping and alpha-test hardware is not utilized, the constraining depth layers may simply be stored during the previous rendering pass in any desired manner.

The pendency of operation 404 is monitored in decision 406. While the at least one additional rendering pass is taking place, portions of the scene relating to the constraining depth layers may be removed in operation 408. In one embodiment, a particular set of tests may be employed to facilitate such removal. It should be noted that such tests may involve as many depth layers/constraints as necessary during each rendering pass in order to collect the desired information. More information on this test will be set forth in greater detail during reference to FIG. 5.

The purpose of operation 408 is to remove any objects, polygons, primitives, etc. or portions (in the form of fragments) thereof related to any constraining depth layers that may be obstructing the at least one additional depth layer that is currently being rendered. By removing such portions of the scene, a result of the rendering pass may be effectively used to extract the information relating to the desired depth layer. Such removal process may be referred to as "depth peeling" or "Z-peeling" due to the manner in which it "peels" each of the portions of the scene relating to the constraining depth layer(s).

Once it is determined that the at least one additional rendering pass is complete in decision 406, the information is collected from the results. See operation 410. Of course, such method 400 may be repeated as many times is needed to collect information from any desired number of depth layers.

Figure 5:
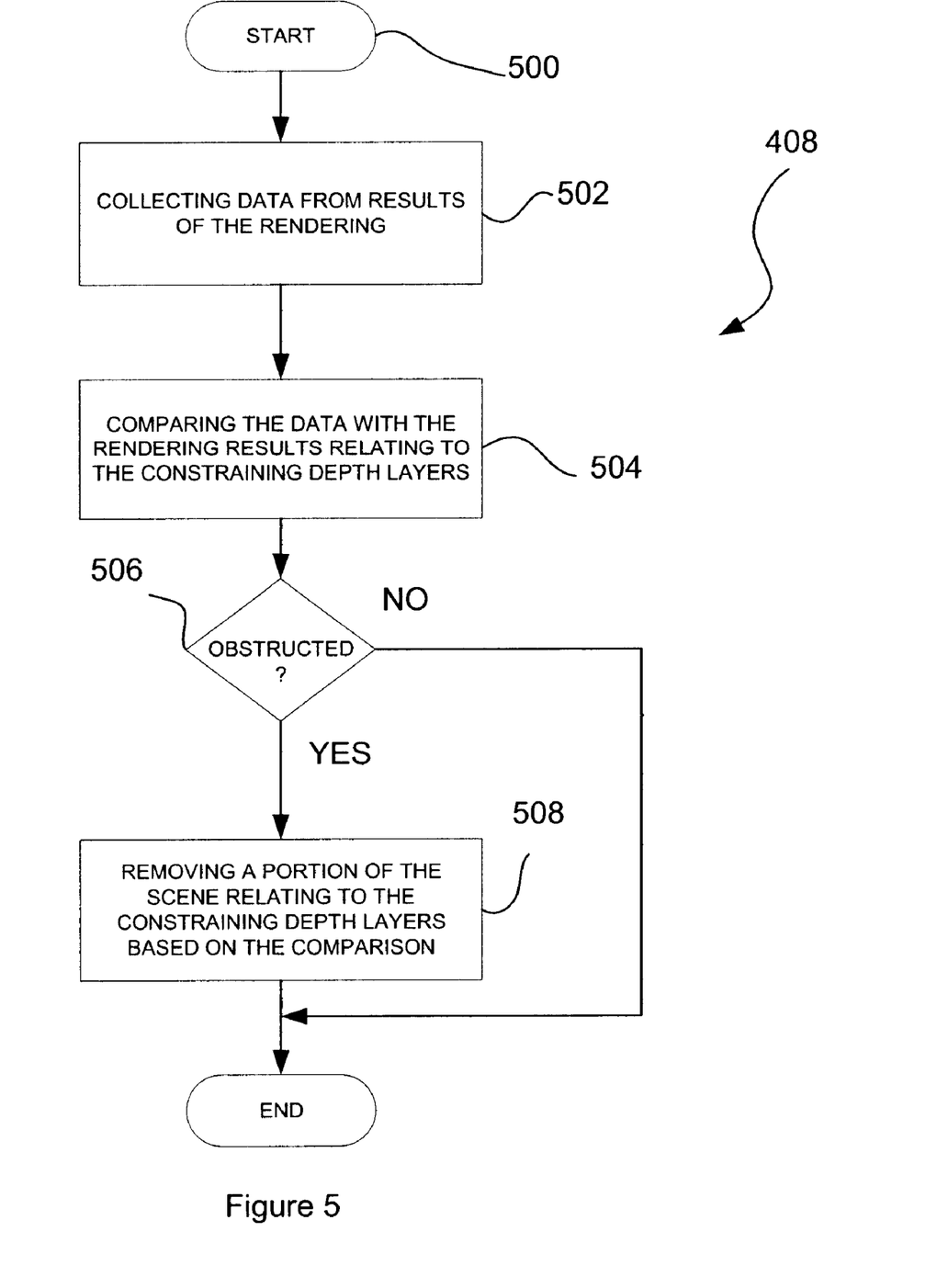
FIG. 5 illustrates a method of conducting a test to remove portions of a scene by "depth peeling" during one of the at least one additional rendering passes of FIG. 4.

FIG. 5 illustrates a method 500 of conducting a test for use during removal of portions of a scene during "depth peeling", in accordance with operation 408 of FIG. 4. While the at least one additional rendering pass is occurring, preliminary data from results of the rendering are collected in operation 502. Such data are compared with the rendering results associated with the constraining depth layers. See operations 504 and 506. More information on the particular values associated with the data of operation 502 and the rendering results of operation 504 will be set forth during reference to FIG. 6.

In the embodiment where shadow-mapping hardware is optionally utilized, it should be noted that the rendering results take the form of shadow maps associated with the constraining depth layers. As will soon become apparent, a portion of the scene relating to the previous depth layer is removed based on the comparison in operation 508.

Figure 6:
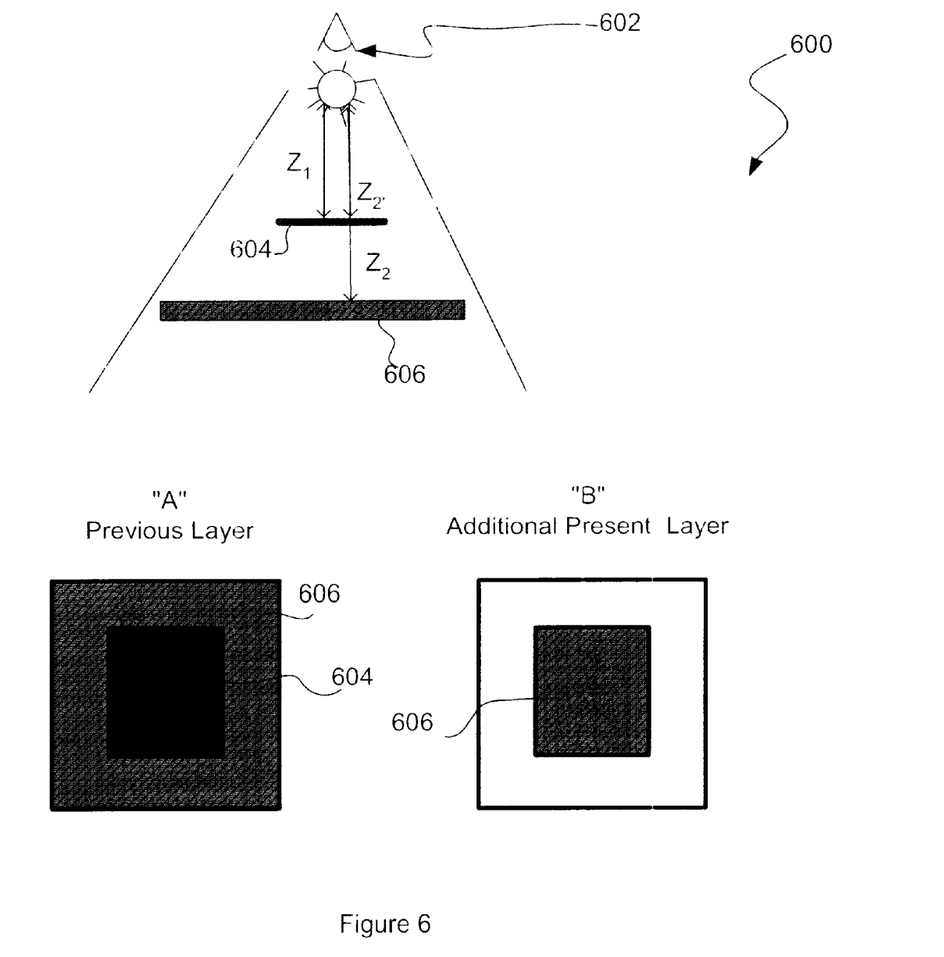
FIG. 6 illustrates the various parameters involved during the test of FIG. 5.

FIG. 6 illustrates the various parameters involved during the test of FIG. 5. As shown, a scene 600 is being rendered during the at least one additional pass from the predetermined eye position associated with the previous rendering pass. Note eye position 602. It should be noted that the example of FIG. 6 does not take into account the possibility of the existence of multiple previous layers for simplicity purposes.

In accordance with operation 502 of FIG. 5, a constraining z-value ($Z_1$) elating to a portion 604 of the scene 600 associated with the constraining depth layer is collected. Further, in accordance with operation 504 of FIG. 5, a second z-value ($Z_2$) relating to a portion 606 of the scene 600 associated with the at least one additional depth layer is collected. The "peeling" process most prevalently happens at the fragment level, so the portions 604 and 606 are generally partial polygons.

It should be noted that the second z-value ($Z_2$) may be greater than or equal to first z-value ($Z_1$) depending on whether a portion 604 of the scene 600 associated with the previous depth layer is in front of the portion 606 of the scene 600 associated with the at least one additional depth layer. Note the second z-value ($Z_2$) and the second z-value prime ($Z_{2'}$), respectively.

In other words, during operation 504 of FIG. 5, difference values are calculated between constraining z-values ($Z_1$) relating to the constraining depth layers and z-values ($Z_2$) relating to the at least one additional depth layer. Upon no difference being calculated between the constraining z-values ($Z_1$) relating to the constraining depth layers and the z-values ($Z_2$) relating to the at least one additional depth layer (when the second z-value is $Z_{2'}$), it may be assumed that the portion 604 of the scene 600 associated with the constraining depth layers obstruct the portion 606 of the scene 600 associated with the at least one additional depth layer. See decision 506 of FIG. 5. In such case, the portion 604 of the scene 600 associated with the constraining depth layers is removed before the results of the rendering are written to the frame buffer. Note the transition from "A", where the portion 604 exists, to "B", where the portion 604 is "peeled", to expose the portion 606 of the scene 600 associated with the at least one additional depth layer.

In the foregoing embodiment, the tests work from a front of the scene 600 to a back of the scene 600. Of course, the tests may also work from a back of the scene 600 to a front of the scene 600. Such back-to-front embodiment may be implemented by changing the decision 506 of FIG. 5. As an option, various other operations (i.e. <,=,<=,=>,!=, etc.) may be used during the course of the aforementioned tests.

It is thus now readily apparent that, by the nature of these tests, it is important that the additional rendering pass be taken from the predetermined eye position associated with the previous rendering passes, since, for the peeling tests to be meaningfuil, the fragment coordinates compared by the tests must belong to the exact same point in space. That is, the multiple rendering passes must match up exactly at fragment coordinates, which implies rendering the scene from the same eye position.

Similarly, it is also readily apparent that, by the same nature of the tests, it is important that all the rendering passes use the exact same method for producing depth values, since a slight difference in depth values for otherwise matching fragments might cause incorrect results for the depth tests. Variance in depth values may arise due to using different methods for producing such coordinates.

The present tests thus output the nearest, second nearest, etc. fragments at each pixel. The present technique may take n passes over a scene in order to get n layers deep into the scene.

Figure 7:
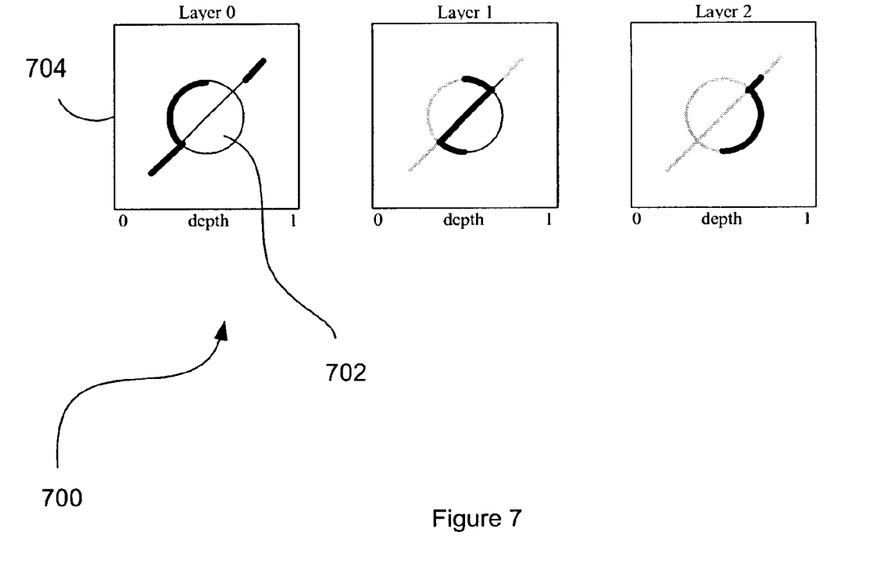
FIG. 7 illustrates an example of the "depth peeling" technique, in accordance with one embodiment.

FIG. 7 illustrates an example 700 of the present technique. As shown, a top view of a cross-section of a teapot 702 is provided with a camera/eye 704 on a leftmost side thereof. A plurality of stages is shown indicating results of depth peeling a plurality of depth layers. As shown, bold lines indicate the layer being captured and lighter lines indicate layers already removed.

In one embodiment, the present embodiment for peeling successive layers of a scene may be carried out utilizing two depth units (depth unit0 and depth unit1) each with an associated depth buffer. Table 1 illustrates the pseudocode associated with such implementation. In each pass except the first, depth unit 0 is used to peel away the previously nearest fragments, while depth unit 1 performs "regular" depth buffering (in the ROP module 159).

TABLE 1

```
for (i=0; i<num_passes; i++)
{
   clear color buffer
   A = i % 2
   B = (i+1) % 2
   depth unit 0:
      if(i == 0)
         disable depth test
      else
         enable depth test
      bind buffer A
      disable depth writes
      set depth func to GREATER
   depth unit 1:
      bind buffer B
      clear depth buffer
      enable depth writes
      enable depth test
      set depth func to LESS
   render scene
   save color buffer RGBA as layer I
}
```

The present embodiment may be applied in numerous ways including computing layered depth images (LDIs), dual-depth (Woo-type) shadow mapping, order-independent transparency rendering, etc. For a non-exhaustive study of some of such related applications of the principles disclosed herein, reference may be made to related co-pending applications entitled "ORDER-INDEPENDENT TRANSPARENCY RENDERING SYSTEM AND METHOD" filed concurrently herewith under Ser. No. 09/944,988 and naming the same inventors as the present application, and "SYSTEM AND METHOD FOR DUAL-DEPTH SHADOW MAPPING" filed concurrently herewith under Ser. No. 09/944,990 and naming the same inventors as the present application, which are each incorporated herein by reference in their entirety.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    (a) collecting a plurality of constraining depth layers;
    (b) rendering a scene utilizing a graphics pipeline;
    (c) performing multiple tests involving the constraining depth layers and results of rendering the scene;
    (d) collecting information about at least one depth layer utilizing the multiple tests; and
    (e) utilizing the information relating to the at least one depth layer to improve processing in the graphics pipeline, wherein the information relating to the at least one depth layer is collected by removing a portion of a scene associated with the constraining depth layers, based on the multiple tests.

2. A method, comprising:
    (a) collecting information relating to a plurality of constraining depth layers, wherein the information relating to the constraining depth layers is collected during a plurality of different rendering passes;
    (b) collecting information relating to at least one additional depth layer; and
    (c) utilizing the information relating to the constraining depth layers and the information relating to the at least one additional depth layer to improve processing in the graphics pipeline.

3. The method as recited in claim 2, wherein the information includes depth values.

4. The method as recited in claim 2, wherein the information relating to the constraining depth layers includes a shadow map for each depth layer.

5. The method as recited in claim 2, wherein the information relating to the constraining depth layers is collected from a user-selected source.

6. The method as recited in claim 5, wherein the information relating to the at least one additional depth layer is collected during at least one additional rendering pass.

7. The method as recited in claim 6, wherein the rendering passes are taken from a same eye position.

8. The method as recited in claim 6, wherein the information relating to the at least one additional depth layer is collected by removing a portion of the scene associated with constraining depth layers.

9. The method as recited in claim 8, wherein the information relating to the at least one additional depth layer is collected by performing a set of tests to determine which portion of the scene associated with the constraining depth layers to remove.

10. The method as recited in claim 9, wherein the tests work from a front of the scene to a back of the scene.

11. The method as recited in claim 10 wherein the tests determine whether the portion of the scene within the constraining depth layers is in front of the at least one additional depth layer.

12. The method as recited in claim 11, wherein the portion of the scene is removed upon the tests determining that the portion of the scene within the constraining depth layers is in front of the at least one additional depth layer.

13. The method as recited in claim 12, wherein the tests calculate a difference between a plurality of z-values relating to the constraining depth layers and a z-value relating to the at least ones additional depth layer.

14. The method as recited in claim 13, wherein the portion of the scene is removed upon no differences being calculated between the z-values relating to the constraining depth layers and the z-value relating to the at least one additional depth layer.

15. The method as recited in claim 14, wherein the z-values relating to the depth layers are generated using a single perspective-interpolation method.

16. The method as recited in claim 9, wherein the test works from a back of the scene to a front of the scene.

17. The method as recited in claim 2, wherein the tests include depth tests.

18. The method as recited in claim 2, wherein the tests include stencil tests.

19. The method as recited in claim 2, wherein the tests include fragment-level tests.

20. A computer program product, comprising:
(a) computer code for collecting a plurality of constraining depth layers;
(b) computer code for rendering a scene utilizing a graphics pipeline;
(c) computer code for performing multiple tests involving the constraining depth layers and results of rendering the scene;
(d) computer code for collecting information about at least one depth layer utilizing the multiple tests; and
(e) computer code for utilizing the information relating to the at least one depth layer to improve processing in the graphics pipeline, wherein the information relating to the at least one depth layer is collected by removing a portion of a scene associated with the constraining depth layers, based on the multiple tests.

21. A computer program product, comprising:
(a) computer code for collecting information relating to a plurality of constraining depth layers, wherein the information relating to the constraining depth layers is collected during a plurality of different rendering passes;
(b) computer code for collecting information relating to at least one additional depth layer; and
(c) computer code for utilizing the information relating to the constraining depth layers and the information relating to the at least one additional depth layer to improve processing in the graphics pipeline.

22. A system, comprising:
(a) logic for collecting a plurality of constraining depth layers;
(b) logic for rendering a scene utilizing a graphics pipeline;
(c) logic for performing multiple tests involving the constraining depth layers and results of rendering the scene;
(d) logic for collecting information about at least one depth layer utilizing the multiple tests; and
(e) logic for utilizing the information relating to the at least one depth layer to improve processing in the graphics pipeline, wherein the information relating to the at least one depth layer is collected by removing a portion of a scene associated with the constraining depth layers based on the multiple tests.

23. A system, comprising:
(a) logic for collecting information relating to a plurality of constraining depth layers, wherein the information relating to the constraining depth layers is collected during a plurality of different rendering passes;
(b) logic for collecting information relating to at least one additional depth layer; and
(c) logic for utilizing the information relating to the constraining depth layers and the information relating to the at least one additional depth layer to improve processing in the graphics pipeline.

24. A system, comprising:
(a) means for collecting a plurality of constraining depth layers;
(b) means for rendering a scene utilizing a graphics pipeline;
(c) means for performing multiple tests involving the constraining depth layers and results of rendering the scene;
(d) means for collecting information about at least one depth layer utilizing the multiple tests; and
(e) means for utilizing the information relating to the at least one depth layer to improve processing in the graphics pipeline, wherein the information relating to the at least one depth layer is collected by removing a portion of a scene associated with the constraining depth layers, based on the multiple tests.

25. A system, comprising:
(a) means for collecting information relating to a plurality of constraining depth layers, wherein the information relating to the constraining depth layers is collected during a plurality of different rendering passes;
(b) means for collecting information relating to at least one additional depth layer; and
(c) means for utilizing the information relating to the constraining depth layers and the information relating to the at least one additional depth layer to improve processing in the graphics pipeline.

26. A method, comprising:
(a) receiving a scene in a graphics pipeline;
(b) receiving at least one user-provided depth layer or shadow map;
(c) executing at least one rendering pass including:
(i) enabling a shadow-mapping feature for defining at least one initial depth layer,
(ii) rendering the scene from the predetermined eye position,
(iii) while rendering in act (ii), removing portions of the scene relating to the at least one initial depth layer by:
(1) collecting data from results of the rendering in act (ii),
(2) comparing the data with the at least one shadow map relating to the initial depth layer, and
(3) conditionally removing a portion of the scene relating to the at least one initial depth layer based on the comparison;
(iv) collecting information relating to an additional depth layer after the removal of the portion of the scene relating to the at least one initial depth layer;

(d) repeating act (c) a predetermined number of instances utilizing an output of a previous instance of act (c) as the at least one initial depth layer; and (e) utilizing the information relating to each of the depth layers to improve processing of the scene in the graphics pipeline.

27. A method, comprising:

(a) receiving a scene in a graphics pipeline;

(b) executing at least one initial rendering pass including:
  (i) rendering the scene from at least one predetermined eye position,
  (ii) outputting at least one shadow map as a result of the rendering, and
  (iii) collecting information relating to at least one depth layer from the at least one shadow map;

(c) executing at least one additional rendering pass including:
  (i) enabling a shadow-mapping feature for defining at least one initial depth layer,
  (ii) rendering the scene from the predetermined eye position,
  (iii) while rendering in act (ii), removing portions of the scene relating to the at least one initial depth layer by:
    (1) collecting data from results of the rendering in act (ii),
    (2) comparing the data with the at least one shadow map relating to the initial depth layer, and
    (3) conditionally removing a portion of the scene relating to the at least one initial depth layer based on the comparison;
  (iv) collecting information relating to an additional depth layer after the removal of the portion of the scene relating to the at least one initial depth layer;

(d) repealing act (c) a predetermined number of instances utilizing an output of a previous instance of act (c) as the at least one initial depth layer; and (e) utilizing the information relating to each of the depth layers to improve processing of the scene in the graphics pipeline.

* * * * *

UNITED STATES PATENT AND TRADEMARK OFFICE
CERTIFICATE OF CORRECTION

PATENT NO. : 6,744,433 B1
APPLICATION NO. : 09/945444
DATED : June 1, 2004
INVENTOR(S) : Bastos et al.

It is certified that error appears in the above-identified patent and that said Letters Patent is hereby corrected as shown below:

col. 9, line 12 replace "ones" with --one--;
    col. 10, line 6 replace "layers" with --layers,--;
    col. 12, line 14 replace "repealing" with --repeating--.

Signed and Sealed this

Sixteenth Day of February, 2010

David J. Kappos
*Director of the United States Patent and Trademark Office*